United States Patent [19]

Tsutsumi et al.

[11] 4,247,708

[45] Jan. 27, 1981

[54] METHOD FOR RENDERING FINE OXIDE POWDER HYDROPHOBIC

[75] Inventors: Yukihiro Tsutsumi; Yutaka Fukuda, both of Tokuyama; Kenichi Matsubara, Yokohama, all of Japan

[73] Assignee: Toyo Soda Manufacturing Co., Ltd., Shinnanyo, Japan

[21] Appl. No.: 6,162

[22] Filed: Jan. 24, 1979

[30] Foreign Application Priority Data

Jan. 30, 1978 [JP] Japan ................. 53/8377

[51] Int. Cl.³ ............................. C07F 7/08
[52] U.S. Cl. ......................... 556/456; 556/450; 556/455; 106/308 Q
[58] Field of Search ................. 106/308 Q, 106/309, 287.14; 260/37 SB, 448.2 R; 556/456, 455, 450

[56] References Cited

U.S. PATENT DOCUMENTS

| | | | |
|---|---|---|---|
| 3,308,093 | 3/1967 | Lentz | 556/456 |
| 3,334,062 | 8/1967 | Brown et al. | 106/308 Q |
| 3,373,138 | 3/1968 | Brown | 260/448.2 R |
| 3,649,588 | 3/1972 | Kennedy-Skipton | 106/308 Q |
| 4,101,499 | 7/1978 | Herzig | 260/37 SB |
| 4,141,751 | 2/1979 | Moreland | 106/308 Q |
| 4,147,707 | 4/1979 | Alewelt et al. | 260/37 SB |
| 4,191,587 | 3/1980 | Kratel et al. | 106/308 Q |

OTHER PUBLICATIONS

Dow Corning Bulletin #22-203, Jun. 1972, "Information about Powder Treatments", (3 sheets).
Dow Corning Bulletin 03-023, Feb. 1967, "Dow Corning Z-6020 Silane", (2 sheets).

*Primary Examiner*—Helen M. McCarthy
*Attorney, Agent, or Firm*—Armstrong, Nikaido, Marmelstein & Kubovcik

[57] ABSTRACT

A method for imparting a hydrophobic property to a fine oxide powder by treating it with an organo-polysiloxane in the presence of an alkali catalyst. The method is carried out with at least 1.5% by weight of organo-polysiloxane of molecular weight not exceeding 10,000, at least 0.5% by weight of ammonia or an aliphatic amine of a boiling point lower than 100° C. and at least 1.5% by weight of water are added to a dry weight of the fine oxide powder (a quantity obtained after removal of adsorption water content under reduced pressure not exceeding 5 mmHg in mercury meter at 100° to 110° C.). Of these additives, the ammonia or the aliphatic amine of a boiling point not exceeding 100° C. is added at a temperature not exceeding 60° C. Then, after an aging process for at least 15 minutes, heating is carried out to a temperature between 60° and 150°0 C. for a period of at least 30 minutes. All processes are carried out under normal pressure.

5 Claims, No Drawings

METHOD FOR RENDERING FINE OXIDE POWDER HYDROPHOBIC

BACKGROUND OF THE INVENTION

1. Field of the Invention

The present invention relates to a method for rendering an inorganic fine oxide powder hydrophobic and more particularly to a method for treating the powder which has a hydrophilic property by allowing an organo-polysiloxane to react with the surface of the powder to change it to be hydrophobic.

2. Description of the Prior Art

Fine oxide powders of silica, alumina, titanium oxide, etc. (hereinafter will be called the powder) are useful industrial materials which are widely in use for pigments, fillers, thickeners, etc. As well known, the surface of the powder is covered with a hydroxyl group and is oleophobic showing a strong affinity for water. The powder thus has a low degree of affinity for organic compounds and, accordingly, the low affinity and a poor dispersibility of the powder often causes inconveniences when it is used with an organic dispersion medium, a high polymer compound or the like.

To eliminate this shortcoming of these powders, there have been reported many treating methods for rendering their surfaces hydrophobic. In respect to the effect attainable by such methods reported, i.e. the degree of the hydrophobic property imparted to the powders and their durability in terms of heat resistance and water resistance shown in the use of them and with safety for the human also taken into consideration, a method of rendering the powder hydrophobic by using an organic silicon compound as hydrophobic property imparting agent and by allowing it to react with the surface hydroxyl group of the powder saliently excels others. Typical known examples of such a method includes the manufacture of a hydrophobic silica product carried out by treating a fine powder of silica.

In the prior arts, an organic silicon compound having a functional group of a very high reactivity with the surface hydroxyl group of the powder, such as an organo-chlorosilane or a silazane is brought into mixing contact with the powder; or with acid such as hydrogen chloride, hydrogen fluoride, fatty acid fluoride etc. or alkali such as ammonia, amine, etc. employed as catalyst, an organo-polysiloxane which is a polymer having the siloxane bond of an organic silicon compound or preferably a cyclic organo-polysiloxane such as hexamethyl cyclo-trisiloxane, octamethyl cyclotetrasiloxane or the like is allowed to react with the surface hydroxyl group of the powder. However these methods of the prior arts have been presenting many problems such as: the degree of the hydrophobic property imparted to a powder, and the adsorbed residue of an organic or inorganic acid, as a catalyst or which is produced as by-product through the reaction of the treatment, which remains in the treated powder; and the problems in connection with handling and the cost of the organo-silicon compound employed as hydrophobic property imparting agent.

For example, a Japanese patent publication No. 45-12567 discloses a method wherein the powder which has an adsorption water content is treated by carrying out a reaction with a cyclo-trisiloxane used as hydrophobic property imparting agent and with ammonia or an amine added as catalyst at a temperature between 15° and 170° C. In accordance with this method, since the cyclo-trisiloxane and the catalyst used are compounds of a low boiling point, the reaction is carried out in a closed system and the temperature must be raised in order to increase the reaction velocity and to obtain a higher hydrophobic property. Therefore, the use of a pressure reactor is required in practicing this method. Further, in this method, the powder and the components required for imparting a hydrophobic property must be mixed more homogeneously. The patent thus also discloses a method for effecting such homogeneous mixing which calls for the use of an organic solvent such as toluene or a method of contacting the powder with the vapor of cyclo-trisiloxane and ammonia or the amine. However, the use of an organic solvent necessitates a troublesome process for removal and recovery of the solvent from the powder after treatment. Besides, it is relatively difficult, even under a high vacuum and at a high temperature, to completely remove a slight amount of the solvent remaining in the treated powder.

Further, in order to quickly contact with the powder and vapor of the components for imparting a hydrophobic property to the powder, heating is necessary and the process must be carried out under pressure, because it takes an excessively long period of time for actual application of the method to leave them at room temperature. Then the use of an organo-polysiloxane and an amine that have a high boiling point becomes impossible.

The specification of a U.S. Pat. No. 3,649,588 discloses a method wherein, for securing a necessary quantity of a catalyst amino compound, particularly that of ammonia, the powder is treated with an organo-polysiloxane under the pressure of the catalytic amino compound. According to the method of using under high pressure, the treatment is carried out immediately with heating to a temperature above 60° C., and of using under low pressure, the treatment is carried out over a long time at a temperature between 20° and 60° C. and then with heating above 100° C. In accordance with the patent, however, the adsorption water content of the powder to be treated is not desirous in general, with the exception of some specific cases, and the allowable quantity of the adsorption water content of the powder is limited to an extremely small quantity ranging from 0.1 to 1.0% by weight even in such specific cases.

As mentioned in the foregoing, the conventionally known arts have been presenting various problems. In addition to such problems, the long treatment reaction time and the necessity of an operation under pressure which calls for complex facilities also present additional problems for industrialization. Further, since the bulk density of the powder to be treated is relatively small in general, such an operation under pressure necessitates the use of a very large reactor for the treatment. Particularly, for carrying out the treatment on an industrial scale, the use of a pressure vessel is very disadvantageous in terms of economy. Further, in cases where ammonia or the like is heated under pressure, such a process presents a greater hazard than a process under normal pressure. Thus the prior arts for imparting a hydrophobic property to the powder necessitate an operation under pressure and have been very unsatisfactory in terms of industrial applications and economy.

SUMMARY OF THE INVENTION

The inventors of the present invention believed that, for obtaining a hydrophobic powder that meets a variety of purposes, it was a very excellent method to make the powder hydrophobic by treating it with an organo-polysiloxane in the presence of an alkali catalyst. Based on this belief, the inventors strenuously conducted studies for elimination of the shortcomings of the conventional arts. As a result of the studies, they have made a novel finding relative to the treatment and have established a method which is highly advantageous for industrial applications. This method makes it possible to quickly treat the powder using a reactor in an open system arrangement under normal pressure for obtaining a highly hydrophobic powder through simplified processes. This method has led to the present invention.

As a result of their studies, it has become manifest that in the treatment of the powder to render it hydrophobic, it is necessary to use water as the third component in addition to an organo-polysiloxane which is used as hydrophobic property imparting agent and ammonia or an amine which is used as catalyst and that there are very important conditions which must be satisfied in the use of them. Without giving heed to such conditions, it is hardly possible to obtain satisfactory results.

First, in adding to and mixing with the powder the necessary components for rendering it hydrophobic and particularly in adding ammonia or an amine of a low boiling point to the powder, heat is produced by the addition and mixing. Then the heat must be restricted to a temperature not exceeding 60° C. and keep the mixture in this temperature condition for a short period of time for aging. It has been unexpectedly found that, with such aging having been carried out, a sufficient quantity of the catalyst can be secured within the reaction system for allowing the treatment reaction to swiftly proceed with a reactor arranged in an open system and even with heating carried out under normal pressure so long as the heating is carried out within a temperature range from 60° to 150° C.

Next, under normal pressure, if water does not exist in quantity at least 1.5 percent by weight for the powder, the treatment reaction comes to proceed at a very slow velocity even with heating carried out at a temperature above 60° C. Further, it has been also found that the use of the well known linear dimethyl polysiloxane which is commercially available by the name of dimethyl silicone oil at a relatively low price as hydrophobic property imparting agent in accordance with this method effectively imparts a higher degree of hydrophobic property to the powder than the cyclic organo-polysiloxane which has hitherto been believed to be preferable in accordance with the prior arts. It has been also found that the above stated use of water and the above stated hydrophobic property imparting agent have a certain degree of effect on the addition of a catalyst as well as on the treatment reaction.

Although the reasons for these novel findings have not been clearly known as yet, the ammonia or the amine which is added as catalyst is readily adsorbed by the surface of the powder and, it seems, the adsorbed state of the catalyst changers relatively quick to become hardly desorptive even under the heating condition which is carried out within the above stated temperature range, so that the catalyst can be sufficiently retained within the treatment reaction system.

The water which is added directly participates in the reaction process between the surface hydroxyl group of the powder and the hydrophobic property imparting agent. In addition to this, the water seems to bring about a promoting effect on the catalyst which is ammonia or an amine; seems to serve to secure the catalyst within the reaction system through the dissolution of the catalyst together with the hydrophobic property imparting agent; and also to play a role of accelerating the above stated change of the adsorbed state of the catalyst.

It is an object of the present invention to provide a novel method, based on these novel findings, for rendering the powder hydrophobic and to make it highly advantageous in terms of quality and economy. The conventional methods for rendering the powder hydrophobic have necessitated the use of a closed system or a pressure vessel and also the use of a solvent. On the other hand, in accordance with the method of this invention, a highly hydrophobic property can be quickly imparted to the powder by simply mixing therewith the components required for imparting a hydrophobic property and through a reaction carried out under normal pressure by a very simple arrangement including a reactor which is equipped, for example, with a reflux condenser of an open system.

In accordance with the invented method, in treating a fine oxide powder with an organo-polysiloxane in the presence of an alkali catalyst, at least 1.5% by weight of an organo-polysiloxane of molecular weight less than 10,000, at least 0.5% by weight of ammonia or an aliphatic amine of a boiling point lower than 100° C. and at least 1.5% by weight of water are added to the dry weight of the powder (quantity obtained with adsorption water content removed under reduced pressure not exceeding 5 mmHg in mercury meter at 100° to 110° C.). The addition of the ammonia or the aliphatic amine having a boiling point lower than 100° C. is carried out at a temperature below 60° C. Following this, the mixture is allowed to have an aging period of at least 15 minutes. Then, heating to a temperature between 60° and 150° C. is carried out for more than 30 minutes. Each of these processes is carried out under normal pressure.

The powder to which the invented treating method is applicable include silica, diatom earth, asbestos, activated clay, talc, alumina, iron oxide, magnesium oxide, titanium oxide, glass balls, etc. which are normally used as fillers or pigments. Although there is no particular restriction, these powders are preferably of grain size not exceeding 10μ and have a surface area between 20 and 600 m²/g (as measured by the so-called BET method which is carried out by nitrogen adsorption).

With regard to reactivity on the hydrophobic property imparting agent, the use of silica or a matter relative to silica as the powder is preferable. The use of the fine powder of silica which is either hydrated silicic acid or silicic acid anhydride generally called a dry process or wet process white carbon is especially suitable for the method of the present invention.

An organo-polysiloxane of molecular weight less than 10,000 can be used for the invented method. In consideration of the hydrophobic property imparting effect attainable and the practical usage thereof, it is preferable to use a linear dimethyl polysiloxane generally known by the name of dimethyl silicone oil which can be expressed by the following generic formula:

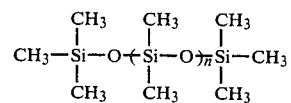

wherein, n represents an integer which is sufficient for obtaining viscosity of 1 to 100 centistokes (hereinafter will be called cs for short) at 25° C. This viscosity corresponds to the molecular weight of the dimethyl polysiloxane and the above stated viscosity range corresponds to n which is within a range from 1 to 100. For desired reactivity of the linear dimethyl polysiloxane to be used in accordance with the invented method, it preferably has viscosity within a range of 1–50 cs and more preferably within a range of 10 to 50 cs, because viscosity which is lower or higher than the viscosity range, i.e. an excessively small or large molecular weight, would result in a lower hydrophobic property of the treated powder.

Further, the use of a linear dimethyl polysiloxane that has a viscosity value exceeding the above stated viscosity range by dissolving it with a solvent such as hexane or benzene to make it appear to be a low viscosity linear dimethyl polysiloxane in carrying out the treating method of the present invention would not bring about any effect as hydrophobic property imparting agent.

In this manner, the invented method is more specific with regard to the hydrophobic property imparting agent than the methods of known prior arts and thus enables to obtain a highly hydrophobic powder, though the reasons for such specific use of the hydrophobic property imparting agent are not clearly known.

In accordance with the invented method, there is no particular restriction on the addition quantity of the hydrophobic property imparting agent so long as it is above 1.5% by weight for a dry weight of the powder (quantity obtained after removal of adsorption water content at a temperature between 100° and 110° C. under reduced pressure less than 5 mmHg in mercury meter). The hydrophobic property of the treated powder increases with the addition quantity of it, however, the effect of addition quantity of it more than 15% by weight is very small. In consideration of the degree of the hydrophobic property that can be imparted to the powder and the economical aspect of the treatment, the hydrophobic property imparting agent is used preferably within the range from 4 to 15% by weight. The hydrophobic property imparting agent usable for carrying out the method of the present invention is in a liquid state at room temperature and can be added to the powder by an ordinary known process.

The catalyst to be used in carrying out the invented method may be ammonia or an amine that is well known. However, since the catalyst is to be removed in general before the use of the treated powder, the hardness or easiness for removal of it must be taken into consideration as an important point in the selection of the catalyst. In the method of the present invention, therefore, ammonia or an aliphatic amine having a boiling point below 100° C. and selected out of low boiling point amines having methyl, propyl and butyl groups is employed as catalyst. Generally, removal of an amine having a higher boiling point from the treated powder is more difficult than a lower boiling point amine. The use of ammonia is preferable for this reason.

The catalyst is used in quantity at least 0.5% by weight for a dry weight of the powder to have the minimum quantity of the catalyst required within the reaction system of the treatment carried out by the invented method. However, the quantity of the catalyst relates to the reaction velocity between the surface hydroxyl group of the powder and the hydrophobic property imparting agent, i.e. the treatment reaction velocity. A smaller quantity requires a longer period of time for treatment while a larger quantity makes the treating period shorter. The use of the catalyst in larger quantity than 10% by weight, however, does not bring a salient improvement in the effect thereof. Therefore, the catalyst is used in quantity preferably within a range from 1.0 to 10.0% by weight.

The catalyst is added to the powder by blowing it in a gas state into the powder if it is in a gas state at room temperature. If the catalyst is in a liquid state, it is added by an ordinary known method. Further, the catalyst may be added to the powder either by dissolving it in the hydrophobic property imparting agent or in the form of an aqueous solution.

In the hydrophobic property imparting method of the present invention, water is another important component. The water is added to the powder in quantity at least 1.5% by weight for a dry weight of the powder. As apparent from its action in the treatment reaction described in the foregoing, the treating time becomes shorter and the hydrophobic property of the treated powder increases as the addition quantity of the water increases. However, it is not desirous for carrying out a treatment process to add water to such a quantity as to bring the whole powder into a suspended state. On the other hand, if the addition quantity of water is less than the above stated quantity, an excessively long period of time is required for the treatment. If no water is allowed to exist, no hydrophobic property will be imparted to the powder. In consideration of the length of time required for treatment, the degree of the hydrophobic property imparted to the treated powder, and the treatment process to be carried out, the preferred quantity of water to be added in accordance with this invention is in a range from 3.0 to 20% by weight.

Generally, the powder is caused by the moisture of air to have water as adsorption water content. Therefore, if the adsorption water content is more than the quantity of water required by the method of the present invention, addition of water is not necessary. Normally, water is added in liquid state. However, it may be added in the form of adsorption water content of the powder by exposing the powder to be treated to an atmosphere having moisture prior to the treatment.

In carrying out the method of the present invention, the three components including the hydrophobic property imparting agent, the catalyst and water which are required for rendering the powder hydrophobic are added to and mixed with the powder. In this process, however, the following two conditions must be satisfied: Of the three components, at least the catalyst which is ammonia or an aliphatic amine having a boiling point below 100° C. must be added and mixed at a temperature not exceeding 60° C.; and then the mixture must be left at the temperature below 60° C. for aging at least for 15 minutes. With these conditions satisfied, the characteristic present intention becomes possible to carry out the treatment reaction under normal pressure and heating condition above 60° C. Failure to meet any of these conditions either would result in a very low hydrophobic property of the treated powder or would make it impossible to impart a hydrophobic property to the powder at all. Although it is preferable to add and mix the catalyst with the powder at a low temperature, the temperature must be above the freezing point of water and is preferably within a range from 5° to 50° C.

There is no restriction on the sequence in which the components are to be added to the powder. However, since the hydrophobic property imparting agent and water have the effect on securing the catalyst within the reaction system as mentioned in the foregoing, the hydrophobic property imparting agent and water are preferably added to the powder prior to addition of the catalyst. On the other hand, when water or the catalyst is added to the powder, particularly to the silica powder which is one of the preferable powders for the method of the present invention, the powder sometimes coagulates to produce a granular solid which tends to prevent homogeneous treatment. It is therefore preferable to first add and mix the hydrophobic property imparting agent with the powder and then either to add the catalyst immediately before addition of water or to add water concurrently with the catalyst such as ammonia in the form of an aqueous solution, or, in cases where the powder already has the above stated minimum necessary quantity of water in the form of an adsorption water content, it is preferable to add water after temperature is raised up to the treatment temperature to allow the reaction system to have a desired quantity of water included therein. It goes without saying that, if before treatment the powder already contains a desired quantity of water, or in cases where the powder is exposed to an atmosphere having moisture and a predetermined quantity of water is gently added to the powder to prevent it from coagulating, the catalyst such as ammonia may be blown into the powder after addition of the hydrophobic property imparting agent.

In the invented method, after the addition of the catalyst, a period of at least 15 minutes is necessary for aging at a temperature below 60° C. The quantity of the catalyst retained within the treatment reaction system increases to some extent with such an aging period up to one hour or thereabout to bring about some effect on the treatment reaction velocity. However, an aging period longer than one hour or thereabout does not bring any salient increase in the effect. Therefore, an aging period of more than 15 minutes suffices. It is thus not necessary to have an aging period longer than one hour in practicing the invented method.

The components indispensable for impartment of a hydrophobic property are thus added to and mixed with the powder; and then, after aging for a short period of time, the mixture is heated to a temperature above 60° C. under normal pressure to allow the treatment to proceed. In the reaction system of the present invention, the reaction of the surface hydroxyl group of the powder proceeds to a tangible degree even at a low temperature close to 0° C. However, at a temperature lower than 60° C., the reaction velocity is very low. On the other hand, at a temperature above 150° C., the impartation of a hydrophobic property becomes impossible, because the catalyst escapes from the reaction system. Accordingly, in the invented method, the treatment temperature is set within a range from 60° C. to 150° C. and preferably between 70° and 130° C. Further, the water added to the reaction system comes to evaporate when the treatment temperature exceeds 100° C. However, such evaporated water can be recirculated to the reaction system by an ordinary known method. Where the catalyst employed is normally in a gaseous state, such as ammonia, a part of the catalyst might sometimes be caused to flow out from a reactor by heating up to the treatment temperature. However, the treatment reaction is not affected by this and the part of the catalyst gas may be collected and handled by an ordinary known method.

Although there is no particular restriction on the period of time required for the treatment reaction, the treatment reaction is preferably carried out at least for 30 minutes. However, carrying out the reaction for a length of time more than 5 hours does not bring much improvement in the hydrophobic property of the treated powder. Therefore, the treatment reaction can be sufficiently carried out in a period of time between 30 minutes and 5 hours.

If addition of the components indispensable for impartment of a hydrophobic property is carried out with thorough stirring and mixing, the treatment reaction would proceed even with the reaction system left intact under a heating condition. However, since such a process tends to produce uneven temperature distribution within the powder and thus tends to result in an uneven result of treatment, it is preferable to carry out the reaction with stirring. Even where the powder has a low degree of fluidity and the added components have not been thoroughly mixed, with such stirring performed during the treatment reaction, the fluidity greatly increases as the hydrophobic property imparting treatment reaction proceeds. This serves to accelerate mixing of each component with the powder, so that the powder can be homogeneously treated. The stirring may be carried out by an ordinary known mechanical method.

The powder which has been treated in this manner is subjected to a heating treatment only when necessary for removal of a nonreacted hydrophobic property imparting agent, water and the catalyst. This heating treatment may be carried out by an ordinary known powder drying method.

The temperature of the heating treatment can be set as desired. Under normal pressure, however, a temperature above 100° C. suffices. However, since the powder treated by the invented method has a high degree of heat resistance, the powder may be heated up to 350° C. as necessary. Further, heating the powder to a temperature above 400° C. should be avoided as the hydrophobic property imparting agent which has reacted on the surface of the powder decomposed at such a high temperature.

The determination of the hydrophobic property of the powder treated in this manner may be simply carried out, for example, as follows: A powder sample is put in a solution of a two-phase system consisting of water and organic solvent insoluble in water, ex. toluene, etc.; then the powder sample is thoroughly shaken; and the powder sample is examined by observation as to which of the phases have the powder suspended therein. Further, in order to clearly find the degree of the hydrophobic property imparted to the powder, mixed solutions each consisting of water and methanol in a ratio different from others may be used and the degree of the hydrophobic property can be clearly determined by the concentration of methanol shown in volume percentage at which the treated powder begins to be wetted with the mixed solution. This measuring method is carried out in the following manner:

Mixed solutions of methanol and water are prepared with the concentration of methanol varied by 5% by volume. Then 5 ml of each of mixed solutions is put in a test tube of capacity 10 ml. Following this, 0.1 to 0.2 g of a powder sample is put in the test tube. The test tube is vigorously shaken and is set still for observation to find the threshold methanol concentration where the whole powder still remains not wetted. The threshold methanol concentration is expressed in an "M value" as a test result. For example, a test result "M value 20" indicates that the powder does not wet in a mixed solution containing 20% by volume of methanol but begins to wet in part in another mixed solution containing 25% by volume of methanol. Further, "M value 0" indicates that the powder is not wetted with water alone but begins to wet at a methanol concentration of 5% by volume. Therefore, a higher M value represents a higher degree of hydrophobic property. In addition to that, in accordance with this measuring method, the degree of complete hydrophobic property can be found in the sense of the term that the powder cannot be wetted with water, so that when treatment is not homogeneously carried out, the result of test will be either indicated by a low M value or not indicated at all. In this measuring method, the ocurrence of wetting can be observed by suspension of the powder in the solution. In most cases, however, the powder remains afloat in the vicinity of the surface of the solution if no wetting takes place there. On the other hand, wetting can be readily confirmed by the precipitation of the powder. In cases where the powder is silica which is one of the matters preferable for use in the method of the present invention, the degree of the hydrophobic property imparted thereto may be also measured, in addition to this M value, by obtaining a "DBA value" which is disclosed in a Japanese patent application laying open publication No. 51-14900. The DBA value also shows the adsorbing property of the powder and, therefore, is a very convenient method for estimation of the quality of the treated powder. These measuring methods are used in the embodiment examples of this invention given herein.

In accordance with the method of this invention, a treated powder which has a very high hydrophobic property or a low adsorbing property having at least an M value of 40 and a very low DBA value can be obtained. The treated powder, however, can be readily measured either in the M value or in the DBA value system according to the purpose of the usage thereof.

The hydrophobic powder obtained by the invented method is a useful material which is usable for a wide ranged purpose, for example, as filler for a high polymer meterial such as an elastomer or plastics, as additive and blending agent for paint, ink, adhesives, an antifoaming agent, cosmetics, grease and the like and also as fluidizing agent, anticoagulent and the like for various powder products.

To further illustrate this invention, and not by way of limitation, the following examples of embodiment are given:

DETAILED DESCRIPTION OF THE PREFERRED EMBODIMENTS

Example 1

A separable flask made of glass and having a content volume of 1 liter was used. The flask was equipped with a gas blowing-in tube, a dropping funnel, a thermometer, a stirrer and a reflux condenser which had a dry ice-methanol trap arranged to pass through from its upper part and to open to the atmosphere. Then, 71.5 g of a wet process white carbon which was made by Nippon Silica Kogyo KK and called by a trade name of NIPSIL VN-3 (LP), having 21% by weight of adsorption water content, measuring about 16 m$\mu$ in grain size, about 250 m$^2$/g in specific surface area and 300 meq/kg in DBA value, was put in the separable flaks. Following this, 7.0 g of dimethyl silicone oil (a product of Shinetsu Kagaku Kogyo KK called by a trade name KF96) which showed viscosity of 10 cs (25° C.) was dropped with stirring at room temperature. Then, 4.5 g of ammonia was blown into the flask in a gaseous state at a rate about 0.5 liter/min.

Heat was produced by the addition of ammonia to raise the temperature of the powder up to 48° C. After completion of the addition of ammonia, aging was allowed to proceed for 30 minutes. Immediately after the aging process, the temperature was raised and 5 g of water was added when the temperature reached 90° C. Under this condition, a reaction was allowed to proceed for 3 hours. The reaction system was cooled and a small amount of ammonia existed in a space within the separable flask was purged by means of nitrogen gas before the powder was taken out therefrom. The powder was put in a constant temperature dryer and a process of drying and removal of ammonia was carried out at 250° C. for 4 hours. The powder treated in this manner had a high fluidity and a very high hydrophobic property measuring 45 in the M value and 45 meq/kg in the DBA value. The treated powder was subjected to durability tests of three different types a, b and c as shown below:

a. Using a Soxhlet's extractor, extraction was carried out with n-hexane and ethyl ether. In both cases, the recovered treated powder measured 45 in the M value and 46 meq/kg in the DBA value.

b. The treated powder was left intact on boiling water for 5 days. However, there took place no suspension and no precipitation in the boiling water. The recovered treated powder measured 45 in the M value and 49 meq/kg in the DBA value.

c. The treated powder was heated in a constant temperature dryer at 300° C. for 5 days. After this, the powder was found 45 in the M value and 40 meq/kg in the DBA value.

The results of these test thus showed that the treated powder obtained by the invented method greatly excelled in durability.

COMPARISON EXAMPLES 1–10

Experiments were conducted in accordance with the procedures and conditions shown in Example 1 with the exception of that some parts of the treating conditions of Example 1 were changed as shown below:

Comparison Example 1

The adsorption water content of the white carbon was arranged to be 0.7% and no water was added.

Comparison Example 2

Ammonia was not added.

Comparison Example 3

Ammonia was added at 80° C. and the aging process was carried out at the same temperature.

Comparison Example 4

After addition of ammonia, no aging process was carried out and heating was carried out immediately to raise temperature to 75° C. after 10 minutes and to 90 after 20 minutes.

Comparison Example 5

After aging, treatment temperature was set at 40° C.

Comparison Example 6

After aging, treatment temperature was set at 160° C.

Comparison Example 7

The dimethyl silicone oil having viscosity of 10 cs (at 25° C.) was replaced with dimethyl silicone oil having viscosity of 300 cs (25° C.) (a product of Shinetsu Kagaku Kogyo called KF 96) and this silicone oil was diluted with n-heptane to viscosity of about 10 cs (25° C.) before it was used in the same quantity as silicon oil.

Comparison Example 8

Hexamethyl disiloxane which was the principal component of dimethyl silicone oil having viscosity of 0.65 cs (at 25° C.) was employed.

Comparison Example 9

The dimethyl silicone oil was replaced with hexamethyl cyclotrisiloxane, which was used in the same quantity.

Comparison Example 10

The dimethyl silicone oil was replaced with octamethyl cyclotetrasiloxane, which was used in the same quantity.

Under the above stated conditions, the following results were obtained from the experiments of these comparison examples:

| Comparison Example | M Value | DBA Value (meq/kg) |
| --- | --- | --- |
| 1 | — | 150 |
| 2 | — | 230 |
| 3 | — | 120 |
| 4 | 0 | 110 |
| 5 | 0 | 112 |
| 6 | — | 125 |
| 7 | — | 165 |
| 8 | — | 143 |
| 9 | 10 | 90 |
| 10 | 10 | 87 |

NOTE
—: M values are not shown because of wetting with water.

The above results of the comparison examples show that: In the method of the present invention, the catalyst and water are indispensable components. Particularly, the velocity of the treatment reaction decreases to a great degree when the addition quantity of water is insufficient. Aging is necessary. The temperature conditions for addition of the catalyst and aging are important. When the reaction temperature is too low, the reaction velocity is greatly decreased. When the treatment temperature is too high, the catalyst comes to dissipate and the reaction velocity also greatly decreases. The reactivity of the dimethyl silicone oil which is used as hydrophobic property imparting agent saliently varies with the range of molecular weight. Further, as compared with the cyclic organo-polysiloxane which has been used in the prior arts as excellent hydrophobic property imparting agent, dimethyl silicone oil gives a higher degree of hydrophobic property.

EXAMPLE 2

Using the same apparatus as in Example 1, 3.5 g of dimethyl silicone oil (a product of Shinetsu Kagaku Kogyo KK called KF 96L) showing viscosity of 2.0 cs (at 25° C.) was dropped in 70.7 g of a wet process white carbon (the same kind as the white carbon used in Example 1) which had 1.0% by weight of adsorption water content. Then, 16.8 g of ammonia aqueous solution of a concentration of 25% by weight was dropped at a temperature between 20° and 30° C. After aging for 20 minutes, heating was carried out at 70° C. for 5 hours. Following the heating, the reflux condenser was removed. With arrangement made to permit water to distill, a process for drying and removal of ammonia was carried out at 150° C. for 5 hours while blowing nitrogen gas into the reactor. The hydrophobic silica thus obtained measured 30 in the M value and 62 meq/kg in the DBA value.

EXAMPLE 3

Using the same apparatus as in Example 1, 10.0 g of dimethyl silicone oil (a product of Shinetsu Kagaku Kogyo KK called KF 96) which showed viscosity of 50 cs (at 25° C.) was dropped into 73.6 g of a wet process white carbon (the same kind as the one used in Example 1) which had 5.2% by weight of adsorption water content. Then, 7 g of trimethyl amine was blown into the powder at a rate of about 0.4 liter/min with arrangement to prevent temperature from being raised above 50° C. by the heat generated. After aging for 60 minutes, heating was carried out at 130° C. for 5 hours. Subsequent procedures were carried out in the same manner as in Example 1 to obtain a hydrophobic silica measuring 20 in the M value and 74 meq/kg in the DBA value.

EXAMPLE 4

Using the same apparatus as in Example 1, 4.0 g of dimethyl silicone oil (a product of Shinetsu Kagaku Kogyo KK called KF 96L) having viscosity of 1.5 cs (at 25° C.) was dropped into 50.8 g of a dry process white carbon (a product of Nippon Aerosil KK called Aerosil 300, measuring about 8 m$\mu$ in grain size, about 300 m$^2$/g in specific surface area and 330 meq/kg in DBA value) which had 1.6% by weight of adsorption water content. Then, 4 g of ammonia was blown into this at a rate of about 0.3 liter/min. Following ammonia, 3.2 g of water was dropped. The temperature of the powder was raised up to 39° C. by the addition of ammonia. After aging for 30 minutes, heating was carried out at 100° C. for 2 hours. Then, the process of drying and removal of ammonia was carried out at 150° C. for one hour in the same way as in Example 2. The hydrophobic silica thus obtained measured 25 in the M value and 80 meq/kg in the DBA value.

EXAMPLE 5

With the same apparatus used as in Example 1, the treatment was carried out in the same manner as in Example 4 with the exception of that a clay which was manufactured by J. M. Huber Co. and called by a trade name of Suprex having 1.9% by weight of adsorption water content and a titanium oxide (a product of Kishita Kagaku) having 0.05% by weight of adsorption water content were employed and that the treatment reaction was carried out at 90° C. for 3 hours.

After treatment, each of the treated powders was put in a two-phase solution consisting of toluene and water and was vigorously shaken. Then, each powder suspended only in the toluene phase thus showing that it was hydrophobic.

What is claimed is:

1. A method for manufacturing a hydrophobic fine oxide powder comprising:

(a) adding to a fine inorganic oxide powder having surface hydroxyl groups, at least 1.5% by weight based on a dry weight of said fine oxide powder said dry weight being measured after removal of a water content by adsorption under reduced pressure not exceeding 5 mm Hg at 100° to 110° C., of a linear-chain dimethyl organo-polysiloxane having a molecular weight not exceeding 10,000 which shows a viscosity value within a range of 1 to 100 centistokes at 25° C.;

(b) adding at least 0.5% by weight, based on said dry weight of said fine oxide powder, of a compound selected from the group consisting of ammonia and an aliphatic amine having a boiling point of lower than 100° C., wherein said compound is added at a temperature below 60° C.;

(c) aging the resulting mixture for at least fifteen minutes at atmospheric pressure in the presence of water in a quantity of at least 1.5% by weight based on said dry weight of said fine powder; wherein essentially no solvent is used in said mixture, and (d) heating said mixture to a temperature between 60° and 150° C. at atmospheric pressure whereby the surface hydroxyl groups of the fine powder react with the organopolysiloxane.

2. A method for rendering a fine oxide powder hydrophobic according to claim 1, wherein said organo-polysiloxane is a linear dimethyl polysiloxane which shows a viscosity value within a range from 10 to 50 centistokes at 25° C.

3. A method for rendering a fine oxide powder hydrophobic according to claim 1 wherein either a part of or the whole of said water to be added is the adsorption water content of said fine oxide powder.

4. A method for rendering a fine oxide powder hydrophobic according to claim 1, wherein, after said organo-polysiloxane is added to and mixed with said fine oxide powder, said compounds selected from the group consisting of ammonia and an aliphatic amine of a boiling point lower than 100° C. and water are added simultaneously.

5. A method for rendering a fine oxide powder hydrophobic according to claim 1, wherein said fine oxide powder is at least one of a group consisting of silica, diatom earth, asbestos, activated clay, talc, alumina, iron oxide, magnesium oxide, titanium oxide and glass balls.

* * * * *